United States Patent
Hansen (10) Patent No.: US 7,463,634 B1
(45) Date of Patent: Dec. 9, 2008

(54) QUALITY CORRELATION TESTING

(75) Inventor: Kevin Harry Hansen, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 722 days.

(21) Appl. No.: 11/067,162

(22) Filed: Feb. 24, 2005

(51) Int. Cl.
*H04L 12/28* (2006.01)
*H04L 12/66* (2006.01)
*G06F 15/16* (2006.01)

(52) U.S. Cl. .................. 370/395.2; 370/401; 709/203; 709/227

(58) Field of Classification Search .............. 370/395.2, 370/401; 709/203, 227
See application file for complete search history.

(56) References Cited

U.S. PATENT DOCUMENTS

| | | | |
|---|---|---|---|
| 6,317,584 B1 * | 11/2001 | Abu-Amara et al. | 455/12.1 |
| 6,741,687 B1 * | 5/2004 | Coppage | 379/114.2 |
| 7,107,344 B2 * | 9/2006 | Davis et al. | 709/227 |
| 7,227,865 B2 * | 6/2007 | Shaheen et al. | 370/395.21 |
| 7,245,609 B2 * | 7/2007 | D'Eletto | 370/352 |
| 2002/0068545 A1 * | 6/2002 | Oyama et al. | 455/406 |
| 2004/0047290 A1 * | 3/2004 | Komandur et al. | 370/230 |
| 2004/0139088 A1 * | 7/2004 | Mandato et al. | 707/100 |
| 2005/0213509 A1 * | 9/2005 | Collomb et al. | 370/252 |
| 2006/0146792 A1 * | 7/2006 | Ramachandran et al. | 370/352 |
| 2006/0187850 A1 * | 8/2006 | Ward et al. | 370/252 |

* cited by examiner

*Primary Examiner*—Alpus H. Hsu (57) ABSTRACT

A session border controller is configured to receive a first session quality message for a session transferred from an origination device in an access provider network to a gateway in the service provider network, receive a second session quality message for the session transferred from the gateway to the origination device, and transfer the first session quality message and the second session quality message to a quality correlation system. The quality correlation system is configured to receive the first session quality message and the second session quality message from the session border controller, receive signaling information for the session, process the signaling information with the first session quality message and the second session quality message to determine a session status message for the session, and transfer the session status message to a client device. The client device is configured to receive and display the session status message.

20 Claims, 7 Drawing Sheets

QUALITY CORRELATION TESTING

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to telecommunication technologies, and in particular, to correlating signaling traffic for service sessions in packet service networks.

2. Description of the Prior Art

Packet based telecommunication services have gained wide spread acceptance as packet related technologies have advanced. For example, many service providers now offer packet voice services. An example of a packet voice service is Voice over Internet Protocol (VoIP) service. In addition, service providers offer a variety of other services, such as multimedia downloading, video conferencing, and data services. One problem associated with packet voice services is reliability. Service providers have not been able to provide high quality service with a robust level of reliability. In addition, service providers have been unable to directly measure the quality of any one call.

Figure 1:
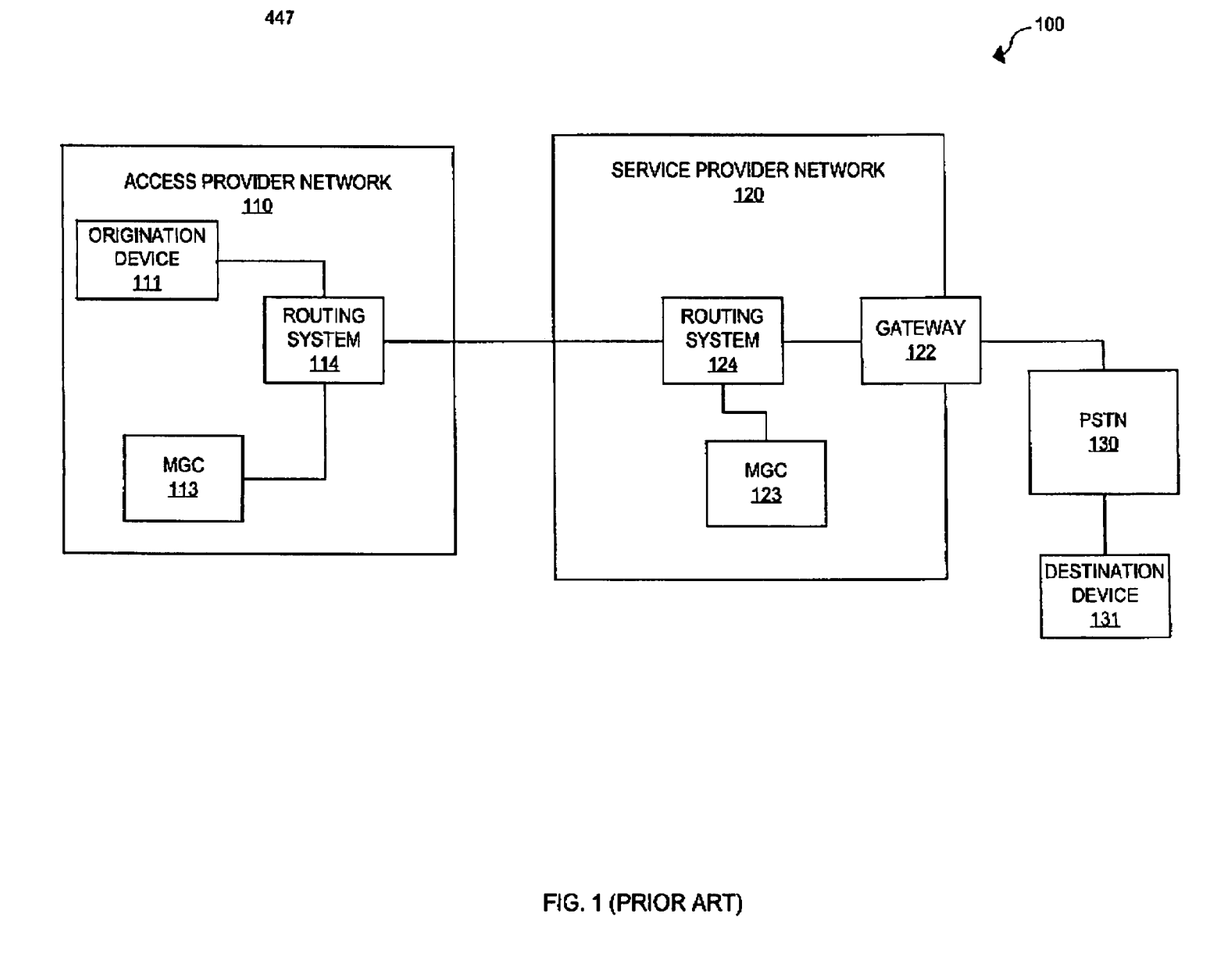
FIG. 1 illustrates telecommunication system 100 in an example of the prior art.

One solution to this problem is the Real-Time Transport Control Protocol (RTCP). RTCP provides a mechanism whereby call quality metrics for a call are measured and reported to ensure high quality packet voice calls. FIG. 1 illustrates a telecommunication system 100 in the prior art that utilizes RTCP.

Telecommunication system 100 includes access provider network 110, service provider network 120, and public switched telephone network (PSTN) 130. Access provider network 110 includes origination device 111, media gateway controller (MGC) 113, and routing system 114. Service provider network 120 includes routing system 124, gateway 122, and MGC 123. PSTN 130 includes destination device 131. As is well known in the art, user communications for a typical call from origination device 111 to destination 131 are routed through routing systems 114 and 124 to gateway 122. Gateway 122 translates the communications from a packet format understood by service provider network 120 to a circuit switched format used by PSTN 130. Elements within PSTN 130 then route the communications to destination device 131.

Figure 2:
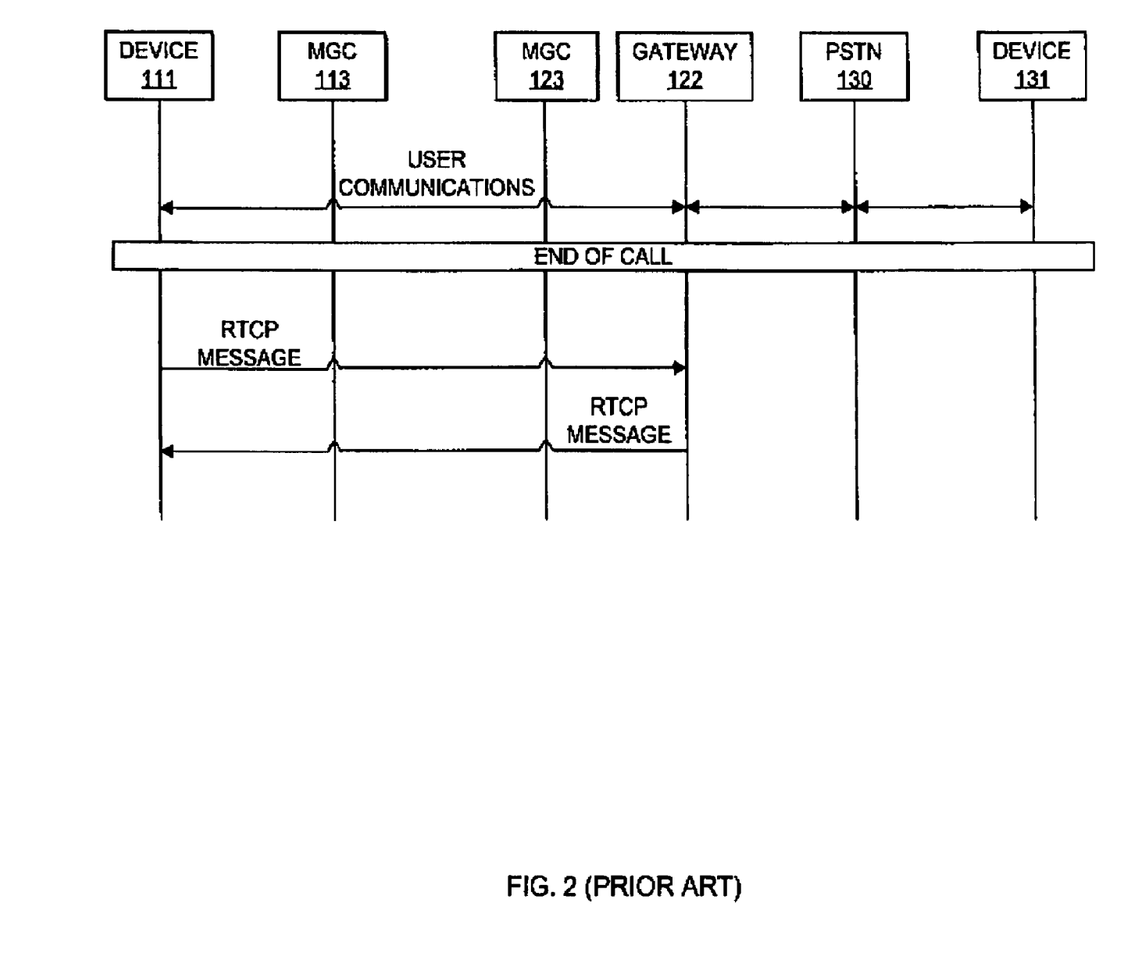
FIG. 2 illustrates a call flow diagram in an example of the prior art.

FIG. 2 illustrates the operation of RTCP in the prior art with respect to telecommunication system 100. As discussed above, user communications for a call are exchanged between origination device 111 and destination device 131. Communications sent from origination device 111 are addressed to gateway 122. Gateway 122 receives the communications and places them in a format to be routed to destination device 131. Communications from destination device 131 are received by gateway 122 and addressed for origination device 111. A number of well known re-addressing schemes are used to hide the actual address of the elements involved in the call.

During the call, origination device 111 collects call performance statistics on the call. For example, origination device 111 collects packet loss, packet delay, and packet jitter statistics for the call. In accordance with RTCP, origination device processes the call statistics at the end of the call to determine a final performance metric for the quality of the entire call. Similarly, gateway 122 collects the same call statistics for the call. Gateway 122 also processes the statistics to determine a final performance metric based on the call statistics.

At the end of the call, the user at origination device 111 ends the call. An on-hook message is transmitted from origination device 111 to MGC 113. In some cases, MGC 113 transmits a call release message to MGC 123 indicating that the call has ended. MGC 123 then transmits an instruction to gateway 122 to release the call. As illustrated in FIG. 2, origination device 111 transmits its final performance metric in an RTCP message to gateway 122 indicating the quality of the call from the perspective of origination device 111. Similarly, gateway 122 transmits its own final performance metric in an RTCP message to origination device 111.

Unfortunately, upon receiving the RTCP message from gateway 122, origination device 111 drops the RTCP message. This is problematic because the RTCP message from gateway 122 is not stored for later network analysis. Thus, any quality issues that may have arisen during the call can only be solved after the call has ended. Additionally, RTCP messages indicate in a quantitative manner that a call has experienced a quality issue. However, RTCP messages do not indicate why a quality problem has occurred.

SUMMARY OF THE INVENTION

An embodiment of the invention helps solve the above problems and other problems by utilizing session quality messages and signaling information to more effectively and efficiently ensure high quality service. The session quality messages are processed with the signaling information to determine a session status message for a particular session. Advantageously, service sessions can be monitored in a real-time manner. Furthermore, additional trouble shooting capabilities are available to service providers for determining the occurrence of a session failure as well as the reasons for a session failure.

In an embodiment of the invention, a service provider network comprises a session border controller for controlling traffic between an access provider network and the service provider network, a quality correlation system in the service provider network, and a client device. The session border controller is configured to receive a first session quality message for a session transferred from an origination device in an access provider network to a gateway in the service provider network, receive a second session quality message for the session transferred from the gateway to the origination device, and transfer the first session quality message and the second session quality message to the quality correlation system. The quality correlation system is configured to receive the first session quality message and the second session quality message from the session border controller, receive signaling information for the session, process the signaling information with the first session quality message and the second session quality message to determine a session status message for the session, and transfer the session status message to the client device. The client device is configured to receive and display the session status message.

In an embodiment of the invention, the session border controller is configured to receive the first session quality message and the second session quality message at the end of the session.

In an embodiment of the invention, the session border controller is configured to receive the first session quality message and the second session quality message periodically during the session.

In an embodiment of the invention, the first session quality message and the second session quality message comprise real-time transport control protocol (RTCP) messages.

In an embodiment of the invention, the signaling information comprises a session initiation protocol (SIP) message and an H.248 message.

In an embodiment of the invention, the session status message indicates a failure of the session and the path of the failure.

In an embodiment of the invention, the path of the failure indicates a network element in the service provider network.

In an embodiment of the invention, the path of the failure indicates the access provider network.

In an embodiment of the invention, the session border controller is further configured to transfer the first session quality message and the second session quality message to the quality correlation system in response to a query from the quality correlation system.

In an embodiment of the invention, the session comprises a voice over packet session.

BRIEF DESCRIPTION OF THE DRAWINGS

The same reference number represents the same element on all drawings.

DETAILED DESCRIPTION OF THE PREFERRED EMBODIMENT

FIGS. 3-7 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

Figure 3:
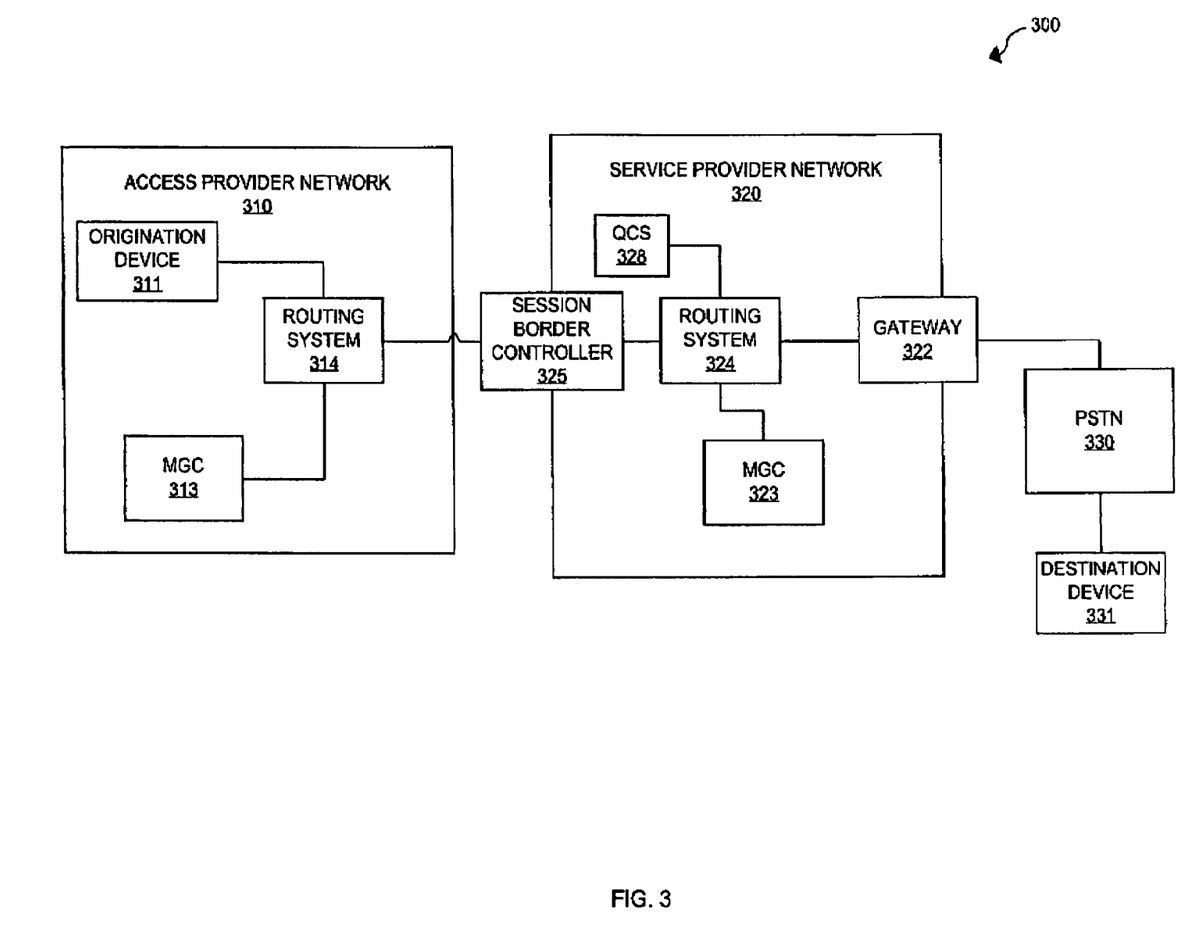
FIG. 3 illustrates a telecommunication system in an embodiment of the invention.
Figure 4:
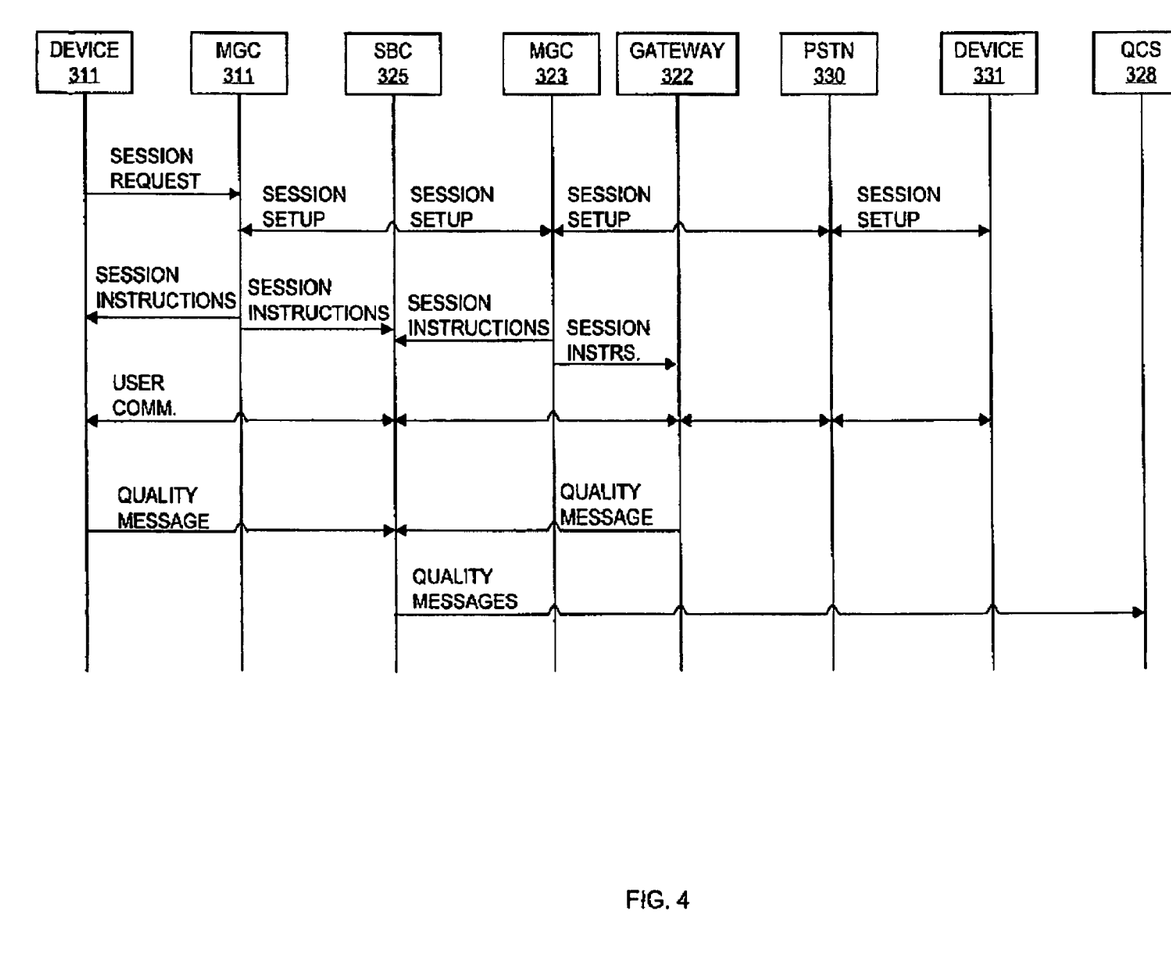
FIG. 4 illustrates a flow diagram in an embodiment of the invention.

FIGS. 3 and 4

FIG. 3 illustrates telecommunication system 300 in an embodiment of the invention. Telecommunication system 300 includes access provider network 310, service provider network 320, and public switched telephone network (PSTN) 330. Service provider network 320 includes routing system 324, gateway 322, media gateway controller (MGC) 323, session border controller 325, and quality correlation system (QCS) 328. Access provider network 310 includes routing system 314, origination device 311, and MGC 313. PSTN 330 includes destination device 331. In this embodiment, service provider network 320 provides services to users of access provider network 310. For example, service provider network 320 provides voice over packet service to users of access provider network 310. Other examples of services include data calls, video conferencing, and real-time video or audio service, as well as other services.

Session border controller (SBC) 325 controls traffic flowing between access provider network 310 and service provider network 320. Routing system 324 routes traffic within service provider network 320. Gateway 322 interfaces traffic to and from service provider network 320 and PSTN 330. MGC 323 controls gateway 322. MGC 323 is also in communication with SBC 325. MGC 323 could be in communication with QCS 328. Routing system 314 routes traffic within access provider network 310. MGC 313 is in communication with origination device 311. Both access provider network 310 and service provider network 320 could include other elements that are not presently shown for the purpose of clarity. It should be understood that the elements of FIG. 3 communicate through routing systems 314 and 324 as is well known in the art with respect to packet based networks.

FIG. 4 illustrates a service session flow diagram in an embodiment of the invention. To begin, a user uses origination device 311 to initiate a service session with destination device 331. In this embodiment, the service session could be a packet over voice service session, as well as other types of sessions. Origination device 311 transmits a session request message to MGC 313. Origination device 311 could be, for example, a wireless phone, a personal computer, a pager, a handheld computing device, as well as other types of devices. The session request message indicates the origin for the service and the destination. MGC 313 processes the requests and transmits session instructions for the session to origination device 311. The session instructions indicate that SBC 325 should be the destination for session traffic sent from origination device 311.

MGC 313 is also in communication with MGC 323 regarding session setup. MGC 323 processes the session request to determine a gateway for the session. Gateway 322 is selected and is instructed to route traffic for the session to PSTN 330. Session identification (ID) codes are used by SBC 325 to hide the actual addresses of elements within both access provider network 320 and service provider network 320. Thus, traffic transmitted by gateway 322 for the session indicates a session ID for the traffic rather than the actual address of origination device 311. SBC 325 translates the session ID to an address for origination device 311 and transmits the traffic to routing system 314 for routing. SBC 325 also shields the address of gateway 322 from access provider network 310. Similarly, origination device 311 utilizes a session ID for traffic sent to service provider network 320 for the session. SBC 325 translates the session ID to the address for gateway 322. Gateway 322 receives the traffic, reads the session ID as the origin header, and responsively routes the traffic to the correct region of PSTN 330.

During the session, origination device 311 monitors the session traffic for quality purposes. For example origination device 311 monitors packet delay, packet jitter, and packet loss characteristics of the session traffic. Similarly, gateway 322 monitors the session traffic for packet delay, jitter, and loss characteristics. Other traffic characteristics could be monitored by origination device 311 and gateway 322. Also during the session, QCS 328 receives and monitors the session traffic for session signaling information. For example, QCS 328 monitors the traffic for session setup, release, and status signaling messages. QCS 328 also monitors the traffic for signaling information indicating a problem, such element failure messages and network failure messages. QCS 328 could receive and monitor the traffic utilizing a remote probe or packet sniffer.

At the end of the session, an end of session signal is generated by either origination device 311 or destination device 331. Origination device 311 processes the packet delay, jitter, and loss characteristics of the session traffic and determines a quality metric for the session. Origination device 311 then transmits a quality message indicating the quality metric. The quality message indicates origination device 311 as the sender and also indicates the session ID. Similarly, gateway 322 process the packet delay, jitter, and loss characteristics of the session traffic to determine a quality metric for the session. Gateway 322 then transmits a quality message indicating the quality metric. The quality message from gateway 322 indicates gateway 322 as the origin and could also indicate the session ID.

SBC 325 receives the quality messages from origination device 311 and gateway 322. SBC 325 then transfers the quality messages to QCS 328. SBC 325 could also forward the quality messages to MGC 323. QCS 328 receives the quality messages from SBC 325 and processes the signaling information with the session quality messages to determine a session status message for the session. For example, the session status message could indicate a successful session or an unsuccessful session. The session status message could also indicate a network element in either access provider network 310 or service provider network 320 that caused an unsuccessful session. QCS 328 then transfers the session status message to a client device. The client device configured to receive and display the session status message.

Advantageously, telecommunication system 300 allows a service provider to better manage a next generation service network. Telecommunication system 300 allows a service provider to utilize quality messages transmitted from network elements, such as origination device 311 and gateway 322, in conjunction with signaling information, to formulate real-time quality control responses to network failures. In particular, additional trouble shooting capabilities are available to service providers for determining the occurrence of a session failure as well as the reasons for a session failure.

Second Embodiment Configuration and Operation

Figure 5:
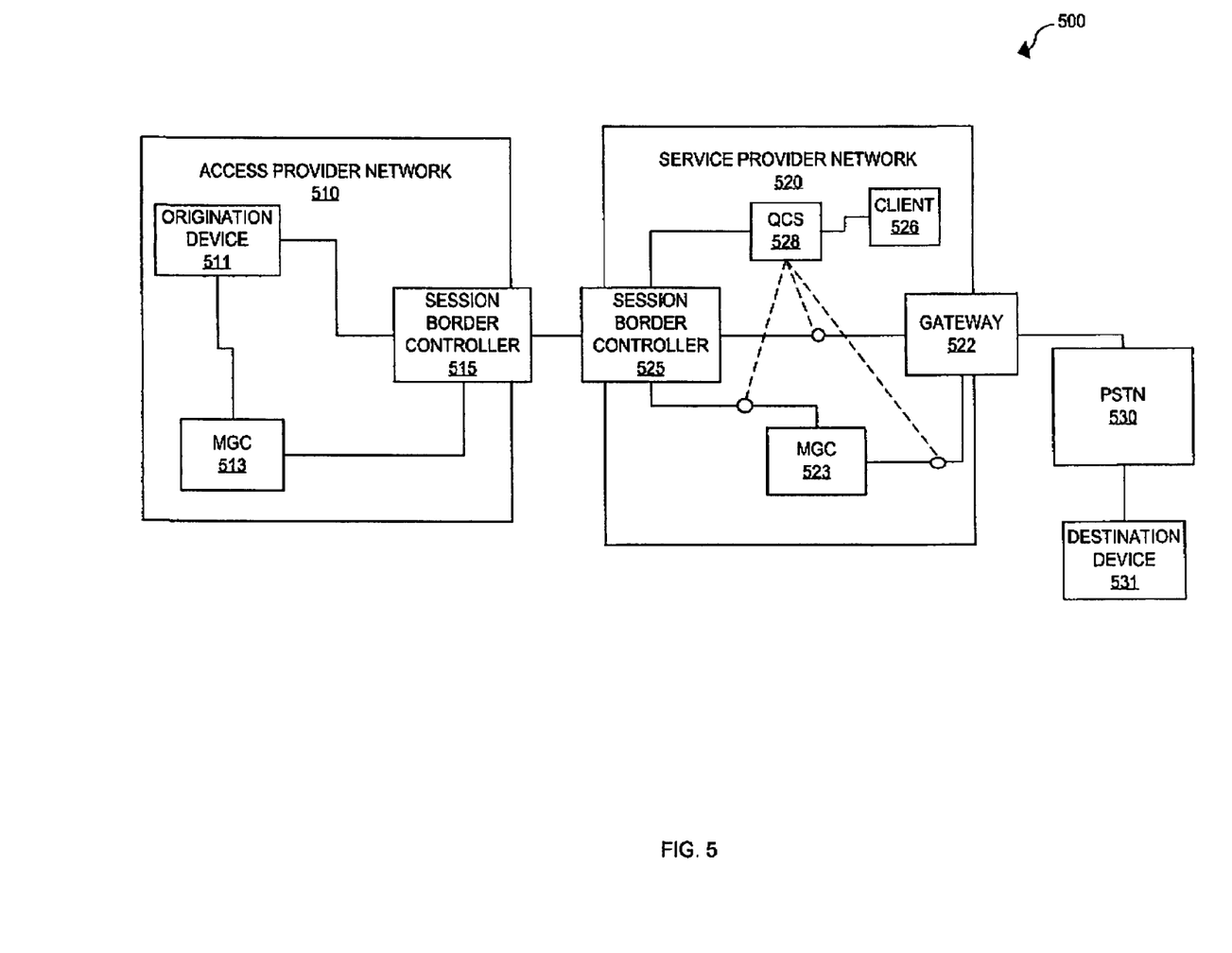
FIG. 5 illustrates a telecommunication system in an embodiment of the invention.
Figure 6:
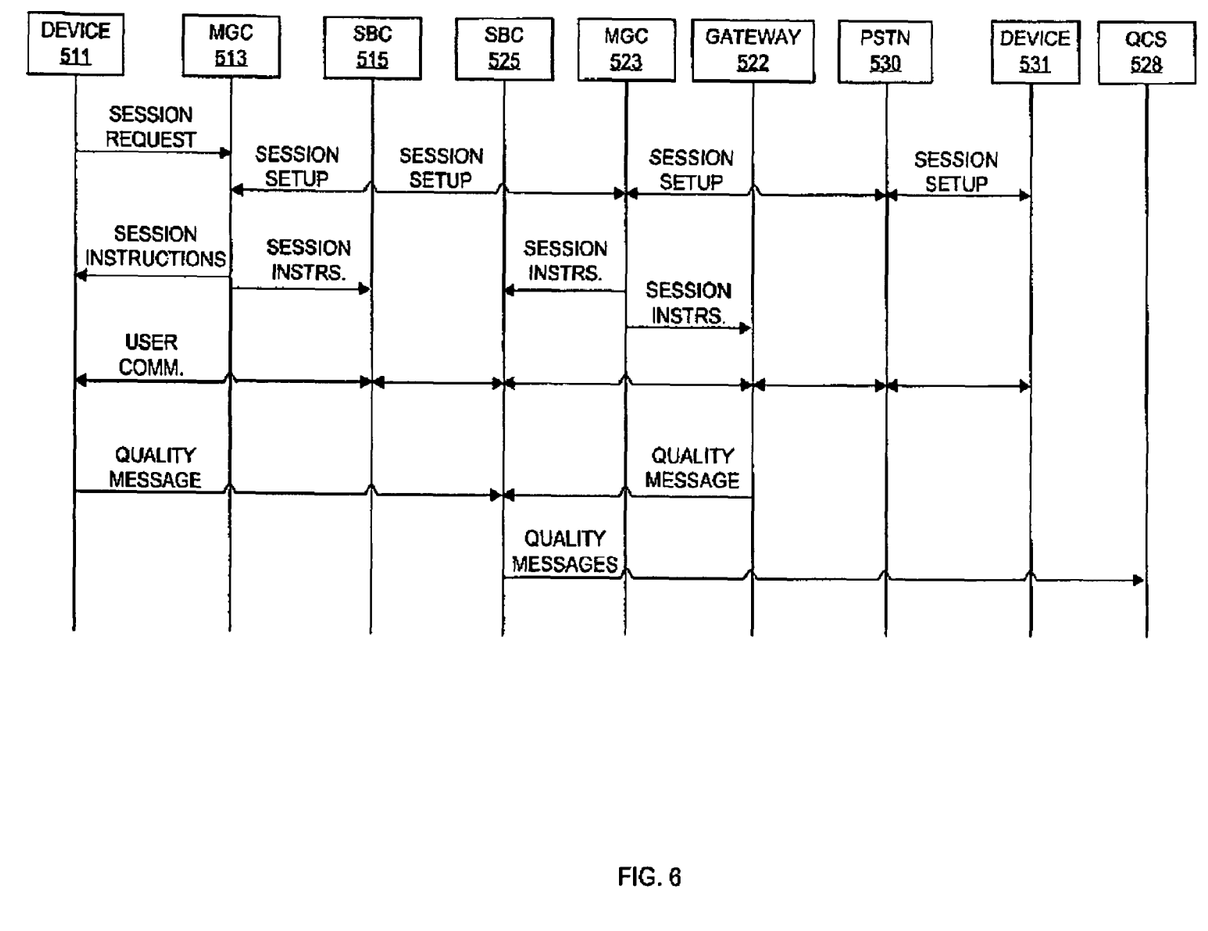
FIG. 6 illustrates a flow diagram in an embodiment of the invention.

FIGS. 5 and 6

FIG. 5 illustrates telecommunication system 500 in an embodiment of the invention. Telecommunication system 500 includes access provider network 510, service provider network 520, and public switched telephone network (PSTN) 530. Service provider network 520 includes gateway 522, media gateway controller (MGC) 523, session border controller 525, quality correlation system (QCS) 528, and client device 526. Access provider network 510 includes SBC 515, origination device 511, and MGC 513. PSTN 530 includes destination device 531. In this embodiment, service provider network 520 provides services to users of access provider network 510. For example, service provider network 520 could provide voice over packet service to users of access provider network 510. Other examples of services include data calls, video conferencing, and real-time video or audio service, as well as other services.

SBCs 525 and 515 control traffic flowing between access provider network 510 and service provider network 520. The traffic is routed over network elements well known in the art, such as packet routers. Gateway 522 interfaces traffic to and from service provider network 520 and PSTN 530. MGC 523 controls gateway 522. MGC 523 is also in communication with SBC 525. MGC 523 could be in communication with QCS 528. MGC 513 is in communication with origination device 511 and SBC 515. QCS 528 monitors traffic between various elements of service provider network 520. Both access provider network 510 and service provider network 520 could include other elements that are not presently shown for the purpose of clarity.

QCS 528 could be configured to monitor traffic streams for call quality and completion metrics. For example QCS 528 could extract signaling from multiple network links or logical connections as shown by the dotted lines in FIG. 5 The signaling could be in several different protocols, such as SIP, SS7, H.248, and Radius, as well as other protocols. Media Gateway Control Protocol (MGCP), also known as H.248 and Megaco, is a standard protocol for handling the signaling and session management needed during a multimedia conference. The protocol defines a means of communication between a media gateway, which converts data from the format required for a circuit-switched network to that required for a packet-switched network and the media gateway controller. MGCP can be used to set up, maintain, and terminate calls between multiple endpoints. Megaco and H.248 refer to an enhanced version of MGCP.

The Session Initiation Protocol (SIP) is an Internet Engineering Task Force (IETF) standard protocol for initiating an interactive user session that involves multimedia elements such as video, voice, chat, gaming, and virtual reality. Like HTTP or SMTP, SIP works in the Application layer of the Open Systems Interconnection (OSI) communications model. The Application layer is the level responsible for ensuring that communication is possible. SIP can establish multimedia sessions or Internet telephony calls, and modify, or terminate them. The protocol can also invite participants to unicast or multicast sessions that do not necessarily involve the initiator. Because the SIP supports name mapping and redirection services, it makes it possible for users to initiate and receive communications and services from any location, and for networks to identify the users wherever they are.

SIP is a request-response protocol, dealing with requests from clients and responses from servers. Participants are identified by SIP URLs. Requests can be sent through any transport protocol, such as UDP, SCTP, or TCP. SIP determines the end system to be used for the session, the communication media and media parameters, and the called party's desire to engage in the communication. Once these are assured, SIP establishes call parameters at either end of the communication, and handles call transfer and termination.

QCS 528, in coordination with client device 526, could create dynamic call detail records (CDRs) with signaling trace data. This would provide the capability for real time call correlation operations. Correlation could create a single sequenced display per call across the multiple protocols involved in each call, and across the multiple switches or regions involved in each call. Furthermore, signaling message decode capability for individual message codes is provided by QCS 528. QCS 528 also provides remote access by client device 526 to detailed call data.

It should be understood that the elements of FIG. 5 communicate through routing systems that are well known in the art with respect to packet based networks. It should also be understood that the connections illustrated in FIG. 5 indicate logical connectivity. The dotted lines extending from QCS 528 indicate which logical connects are monitored by QCS 528.

FIG. 6 illustrates a service session flow diagram in an embodiment of the invention. To begin, a user uses origination device 511 to initiate a service session with destination device 531. In this embodiment, the service session could be a packet over voice service session, as well as other types of sessions. Origination device 511 transmits a session request message to MGC 513. The session request message indicates the origin for the service and the destination. MGC 513 processes the request and transmits session instructions for the session to origination device 511. The session instructions indicate that SBC 515 should be the destination for session traffic sent from origination device 511. MGC 513 also transmits session instructions to SBC 515. The session instructions indicate that origination device 511 is the origin for the session and that SBC 525 is the destination.

MGC 513 is also in communication with MGC 523 regarding session setup. MGC 523 processes the session request to determine a gateway for the session. Gateway 522 is selected and is instructed to route traffic for the session to PSTN 530. Session identification (ID) codes are used by SBC 525 and SBC 515 to hide the actual addresses of elements within both access provider network 510 and service provider network 520.

For example, traffic flowing from service provider network 520 to access provider network 510 is transmitted by gateway 522 for the session. This traffic indicates a session ID as the destination for the traffic rather than the actual address of origination device 511. SBC 525 replaces the origin address of traffic from gateway 522 with the session ID, thereby shielding the address of gateway 522 from access provider network 510. The destination address is changed from the session ID to the address for SBC 515. SBC 525 then transfers the traffic to SBC 515. SBC 515 translates the session ID to an address for origination device 511 and transmits the traffic to origination device 511.

Traffic flowing from access provider network 510 to service provider network 520 is first transmitted from origination device 511. This traffic indicates a session ID as the destination for the traffic rather than the actual address of gateway 522. SBC 515 replaces the origin address of traffic from origination device 511 with the session ID, thereby shielding the address of origination device 511 from service provider network 520. The destination address is changed from the session ID to the address for SBC 525. SBC 515 then transfers the traffic to SBC 525. SBC 525 translates the destination address to an address for gateway 522 and transmits the traffic to origination device 511. Gateway 522 receives the traffic, reads the session ID as the origin header, and responsively routes the traffic to the correct region of PSTN 530.

During the session, origination device 511 monitors the session traffic for quality purposes. For example origination device 511 monitors packet delay, packet jitter, and packet loss characteristics of the session traffic. Similarly, gateway 522 monitors the session traffic for packet delay, jitter, and loss characteristics. Other traffic characteristics could be monitored by origination device 511 and gateway 522. Also during the session, QCS 528 receives and monitors the session traffic for session signaling information. For example, QCS 528 monitors the traffic for session setup, release, and status signaling messages. QCS 528 also monitors the traffic for signaling information indicating a problem, such as element failure messages and network failure messages. QCS 528 could receive and monitor the traffic utilizing a remote probe or packet sniffer.

At the end of the session, an end of session signal is generated by either origination device 511 or destination device 531. Origination device 511 processes the packet delay, jitter, and loss characteristics of the session traffic and determines a quality metric for the session. Origination device 511 then transmits a quality message indicating the quality metric. The quality message indicates origination device 511 as the sender and also indicates the session ID. Similarly, gateway 522 process the packet delay, jitter, and loss characteristics of the session traffic to determine a quality metric for the session. Gateway 522 then transmits a quality message indicating the quality metric. The quality message from gateway 522 indicates gateway 522 as the origin and could also indicate the session ID. In an alternative, origination device 511 and gateway 522 could periodically generate and process quality messages. For example, a quality message could be generated every 2 seconds of a session.

SBC 525 receives the quality message from origination device 511 via SBC 515, and also receives the quality message from gateway 522. SBC 525 then transfers the quality messages to QCS 528. SBC 525 could also forward the quality messages to MGC 523. In an alternative, SBC 525 could receive a query from QCS 528. In response to the query, SBC 525 could transmit the quality message for the session. The query would indicate the session by a user ID, a SIP address, a session ID, as well as by other means.

QCS 528 receives the quality messages from SBC 525 and processes the signaling information with the session quality messages to determine a session status message for the session. For example, the session status message could indicate a successful session or an unsuccessful session. The session status message could also indicate a network element in either access provider network 510 or service provider network 520 that caused an unsuccessful session. The quality message transmitted by origination device 511 and gateway 522 could be RTCP messages. QCS 528 then transfers the session status message to client device 526. The client device configured to receive and display the session status message.

Advantageously, telecommunication system 500 allows a service provider to better manage a next generation service network. Telecommunication system 500 allows a service provider to utilize quality messages transmitted from network elements, such as origination device 511 and gateway 522, in conjunction with signaling information, to formulate real-time quality control responses to network failures. In particular, additional trouble shooting capabilities are available to service providers for determining the occurrence of a session failure as well as the reasons for a session failure.

Computer System

Figure 7:
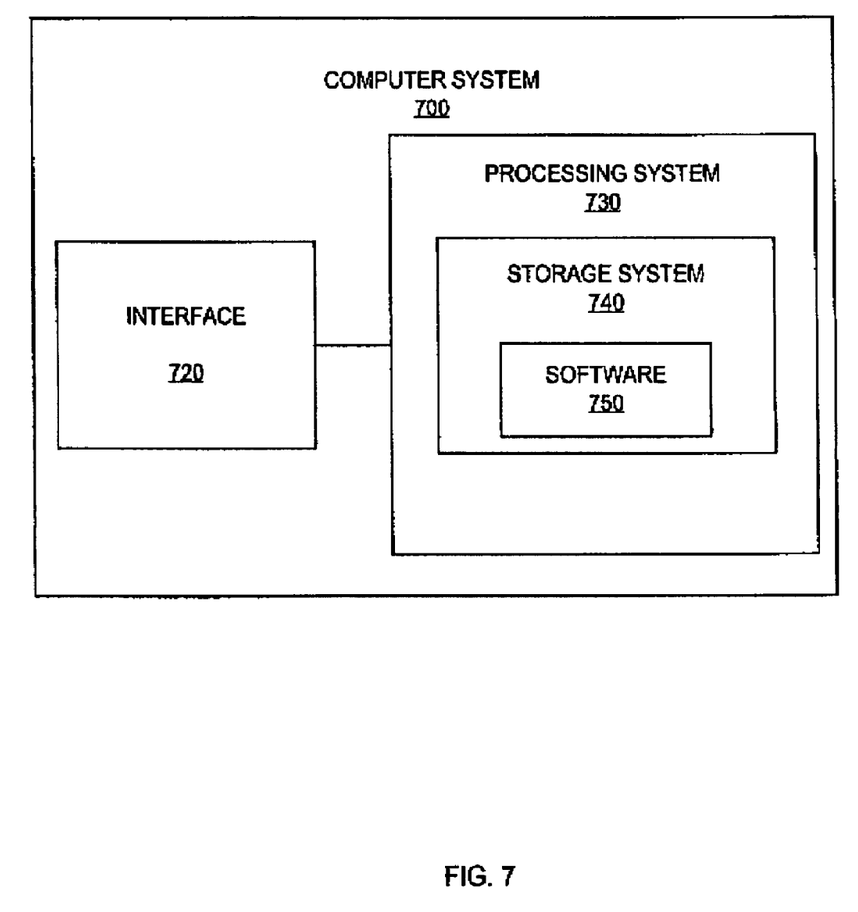
FIG. 7 illustrates a computer system in an embodiment of the invention.

FIG. 7 illustrates computer system 700 in an embodiment of the invention. Computer system 700 includes interface 720, processing system 730, storage system 740, and software 750. Storage system 740 stores software 750. Processing system 730 is linked to interface 720. Computer system 700 could be comprised of a programmed general-purpose computer, although those skilled in the art will appreciate that programmable or special purpose circuitry and equipment may be used. Computer system 700 may use a client server architecture where operations are distributed among a server system and client devices that together comprise elements 720-750.

Interface 720 could comprise a network interface card, modem, port, or some other communication device. Signaling interface 720 may be distributed among multiple communication devices. Interface 730 could comprise a computer microprocessor, logic circuit, or some other processing device. Processing system 730 may be distributed among multiple processing devices. Storage system 740 could comprise a disk, tape, integrated circuit, server, or some other memory device. Storage system 740 may be distributed among multiple memory devices.

Processing system 730 retrieves and executes software 750 from storage system 740. Software 750 may comprise an operating system, utilities, drivers, networking software, and other software typically loaded onto a general-purpose computer. Software 750 could also comprise an application program, firmware, or some other form of machine-readable processing instructions. When executed by the processing system 730, software 750 directs processing system 730 to operate as described for telecommunication systems 300 and 500.

What is claimed is:

1. A service provider network comprising:
    a session border controller for controlling traffic between an access provider network and the service provider network;
    a quality correlation system in the service provider network; and
    a client device;
    the session border controller configured to receive a first session quality message for a session transferred from an origination device in the access provider network to a gateway in the service provider network, receive a second session quality message for the session transferred from the gateway to the origination device, and transfer the first session quality message and the second session quality message to the quality correlation system;
    the quality correlation system configured to receive the first session quality message and the second session quality message from the session border controller, receive signaling information for the session, process the signaling information with the first session quality message and the second session quality message to determine a session status message for the session, and transfer the session status message to the client device; and
    the client device configured to receive and display the session status message.

2. The service provider network of claim 1 wherein the session border controller is configured to receive the first session quality message and the second session quality message at the end of the session.

3. The service provider network of claim 1 wherein the session border controller is configured to receive the first session quality message and the second session quality message periodically during the session.

4. The service provider network of claim 1 wherein the first session quality message and the second session quality message comprise real-time transport control protocol (RTCP) messages.

5. The service provider network of claim 1 wherein the signaling information comprises a session initiation protocol (SIP) message and an H.248 message.

6. The service provider network of claim 1 wherein the session status message indicates a failure of the session and a path of the failure.

7. The service provider network of claim 6 wherein the path of the failure indicates a network element in the service provider network.

8. The service provider network of claim 6 wherein the path of the failure indicates the access provider network.

9. The service provider network of claim 1 wherein the session border controller is further configured to transfer the first session quality message and the second session quality message to the quality correlation system in response to a query from the quality correlation system.

10. The service provider network of claim 1 wherein the session comprises a voice over packet session.

11. A method of operating a service provider network comprising a session border controller for controlling traffic between an access provider network and the service provider network, a quality correlation system in the service provider network, and a client device, the method comprising:
    in the session border controller, receiving a first session quality message for a session transferred from an origination device in the access provider network to a gateway in the service provider network, receiving a second session quality message for the session transferred from the gateway to the origination device, and transferring the first session quality message and the second session quality message to the quality correlation system;
    in the quality correlation system, receiving the first session quality message and the second session quality message from the session border controller, receiving signaling information for the session, processing the signaling information with the first session quality message and the second session quality message to determine a session status message for the session, and transferring the session status message to the client device; and
    in the client device, receiving and displaying the session status message.

12. The method of claim 11 wherein further comprising the session border controller receiving the first session quality message and the second session quality message at the end of the session.

13. The method of claim 11 further comprising the session border controller receiving the first session quality message and the second session quality message periodically during the session.

14. The method of claim 11 wherein the first session quality message and the second session quality message comprise real-time transport control protocol (RTCP) messages.

15. The method of claim 11 wherein the signaling information comprises a session initiation protocol (SIP) message and an H.248 message.

16. The method of claim 11 wherein the session status message indicates a failure of the session and a path of the failure.

17. The method of claim 16 wherein the path of the failure indicates a network element in the service provider network.

18. The method of claim 16 wherein the path of the failure indicates the access provider network.

19. The method of claim 11 further comprising the session border controller transferring the first session quality message and the second session quality message to the quality correlation system in response to a query from the quality correlation system.

20. The method of claim 11 wherein the session comprises a voice over packet session.

* * * * *